Patented Oct. 31, 1933

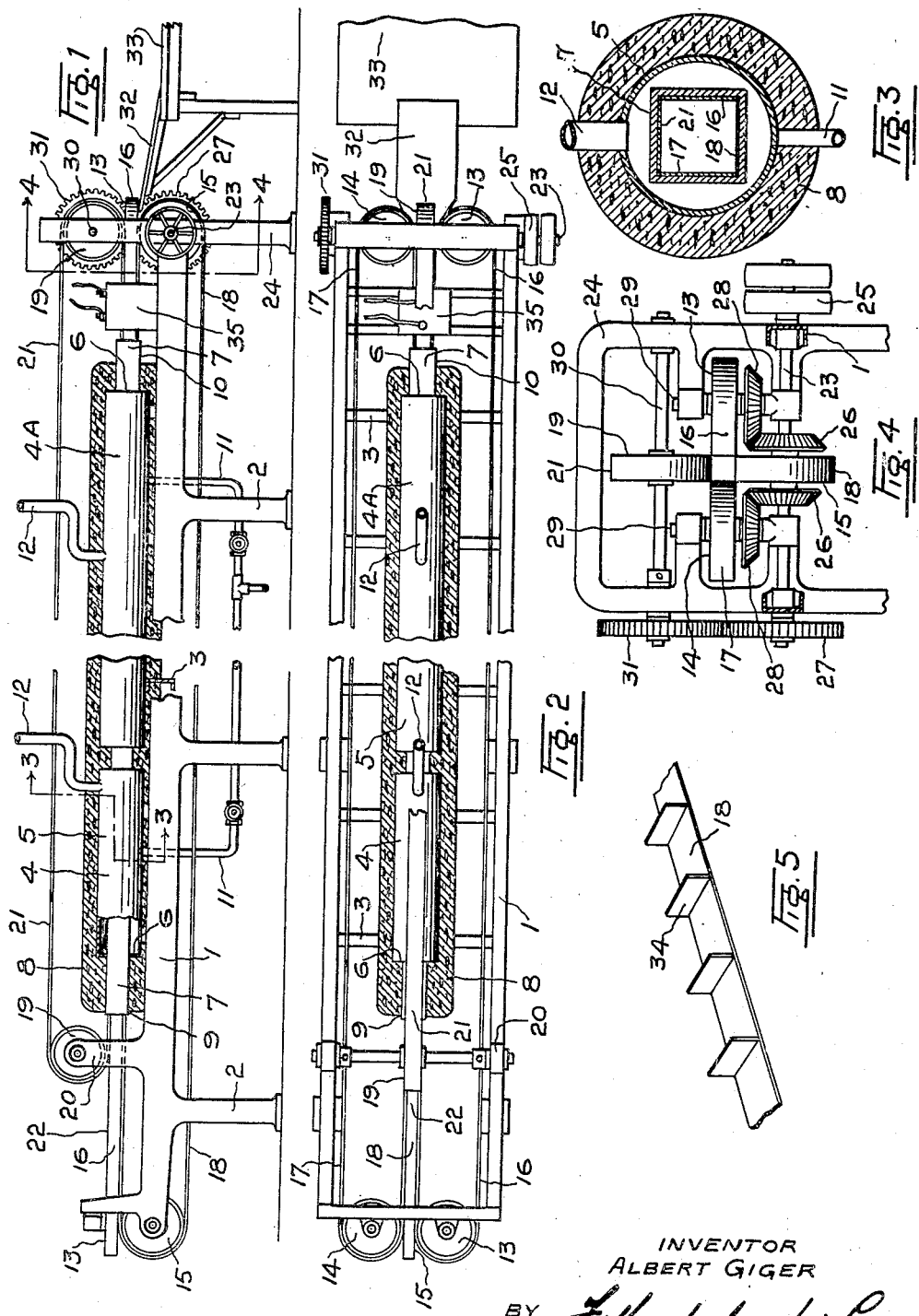

1,932,887

UNITED STATES PATENT OFFICE 1,932,887

SHARP FREEZING DEVICE AND PROCESS

Albert Giger, Vancouver, British Columbia, Canada

Application November 26, 1930
Serial No. 498,406

4 Claims. (Cl. 62—114)

My invention relates to improvements in sharp freezing devices and processes which are particularly adapted for freezing food products packed in cartons and the like.

The objects of the invention are to provide means capable of operation on a flooded system, a direct expansion system or a brine system, whereby the product to be frozen is brought into close proximity with the walls of the device and moved continuously therealong so that the desired freezing is accomplished with any desired rapidity and the product delivered ready for storing and shipping.

In most freezing devices hitherto used the product is subjected to a heavy moisture bearing atmosphere when passing through the freezing zone which causes heavy frosting or glazing and delays the freezing process, the product is usually sparcely spaced in the freezing zone, thus requiring devices of relatively great dimensions compared with that required by my process. A further object is to provide means whereby the ends of the freezing zone may be sealed by the product so that maximum freezing effect may result and a minimum of moisture enter said zone and freeze upon its wall surfaces.

The invention consists essentially of a tubular passage through which a product is adapted to pass to discharge, said passage being surrounded by a sealed chamber in the form of a refrigerating unit or brine tank and a conveyor for passing the product through the tubular passage, as will be more fully described in the following specification and shown in the accompanying drawing, in which:—

Fig. 1 is an elevation with part in section of the invention.

Fig. 2 is a plan view.

Fig. 3 is a sectional view of the evaporating tank and tubular passage taken on the line 3—3 of Figure 1.

Fig. 4 is a sectional view of the driving mechanism taken on the line 4—4 of Figure 1.

Fig. 5 is a perspective view of a modified form of conveyor belt.

In the drawing like characters of reference indicate corresponding parts in each figure.

The numeral 1 indicates a frame carried upon legs 2 and having transverse members 3 intermediate its length which support one or more refrigerating units generally indicated by the numerals 4 and 4A. The refrigerating units each consist of a horizontal cylindrical body 5 having end walls 6 and a rectangular tubular core 7 extending through and beyond the body 5 to form a freezing zone or passage through which the product to be frozen is conveyed.

The cylindrical bodies 5 are entirely enveloped with cork or other insulation as at 8, which insulation is preferably extended to the entering end of the tubular core 7 as at 9, but terminates short of the discharge end of the core as at 10. Each body 5 is fitted with a suitably valved inlet pipe 11 and an outlet pipe 12 for the admission to and extraction from, of a refrigerating media, such as ammonia, carbon dioxide or cold brine.

Suitably journalled at opposite ends of the frame 1 are aligned pairs of pulleys 13, 14 and 15, which are connected together by endless flexible belts 16, 17 and 18. A further pair of pulleys 19 are provided, in which one is at the discharge end of the device and the other between a pair of standards 20 intermediate the length of its frame 1, which pulleys are connected together by a belt 21.

The belts 16, 17 and 18 pass through the tubular core 7 in contact with its bottom and side walls and form an open topped conveyor channel at the entering end of the device as at 22. The lower run of the belt 21 passes through the core 7 in contact with its top wall and with the other belts form a four sided conveyor of somewhat greater length than the core 7. The drive is communicated to the several belts from a horizontal shaft 23 journalled in a transverse frame 24 at the discharge end of the device, which shaft is fitted with a driven pulley 25, a pair of mitre gears 26 and a gear wheel 27. The mitre gears 26 drive two other similar gears 28 secured to vertically mounted shafts 29 upon which one of each of the pairs of pulleys 13 and 14 are secured. A further horizontal shaft 30 is journalled in the frame 24 which is fitted with one of the pair of pulleys 19 and a gear wheel 31 which is driven from the gear wheel 27 of the shaft 23, so that all the belts travel throughout the freezing zone at uniform speed and in a similar direction. At the discharge end of the conveyor belts a sloping chute 32 is provided, which is adapted to deliver goods received therefrom onto a table 33.

In the modification shown in Figure 5, the belt 18 is provided with upstanding transverse divisions 34 which are preferably of similar dimensions to the space between the forward run of the belts, so as to divide the freezing zone into a plurality of compartments and to seal the ends of said zone within a relatively short distance of the entering and discharge ends thereof. The divisions 34 also serve, when freezing packages of irregular size and shape to prevent one package from contacting with another and freezing together.

Between the discharge end of the evaporating unit 4A and the transverse frame 24 an electrical heater 35 is provided, which surrounds the four belts forming the conveyor, and is adapted to impart to them sufficient heat to overcome any frost which may have caused an article frozen therebetween to adhere to the belts that it may be freely discharged onto the chute 32.

In operation the hollow bodies 5 are connected with a suitable refrigerating machine and are operated on the direct expansion or flooded system, or alternately supplied with circulating cold brine. If two or more hollow bodies are employed, the one nearest the entering end would be maintained at a relatively high temperature and those towards the discharge end would be maintained at a lower temperature. The product to be frozen would preferably be packed in cartons of the same cross sectional dimension as the space between adjacent portions of the belts 16, 17, 18 and 21, placed between the belts 16 and 17 and upon the belt 18, and carried along thereby through the first insulated end 9 of the core where a relatively slight temperature change is manifested, then through that portion of the core which is chilled by the refrigerating media in the hollow body, where the heat of the article is progressively removed until the desired temperature is obtained therethrough. After chilling is completed the article passes through the outer insulated portion 10 of the core then through the heating element 35 where the carton is defrosted and is subsequently discharged onto the table.

The process of passing the article first through a moderately cold zone, such as through the insulated portion 9 of the core prior to its entering a low temperature zone reduces the accumulation of condensation and frost on the package and a similar condensation and frost between the belt surfaces and the walls of the core 7, so that the frequent defrosting of the exposed areas is not necessary and prolonged continuous runs are assured.

What I claim as my invention is:

1. A sharp freezing device comprising a hollow body adapted to contain a refrigerant, said body having an open ended passage forming a freezing zone extending therethrough, a plurality of conveyor belts extending through and beyond said passage in substantial contact with two of its walls, said conveyor belts being so disposed in relation to each other as to form a channel for the reception of food products for conveyance through the freezing zone.

2. A sharp freezing device comprising a hollow body having an open ended rectangular passage having enclosing walls forming a freezing zone extending therethrough, four endless conveyor belts extending through said passage, each belt substantially covering and contacting with a passage side wall, three of said belts extending beyond the ends of the passage and forming a channel adapted to receive food products for passage therethrough and the fourth belt forming a cover for a portion of the channel.

3. A sharp freezing device comprising a sealed hollow body adapted to contain a refrigerant, said body having a hollow core defining a tubular passage, said passage forming a freezing zone, a tubular extension to said passage at one end of the hollow body having an insulating covering adjacent the hollow body, and means for heating said passage extension at a point remote from the hollow body.

4. In a sharp freezing device consisting of a hollow body having an open ended passage extending therethrough and forming a freezing zone, a conveyor belt extending through said passage and spaced means carried by said belt for dividing said passage into a plurality of adjoining chambers, said means being adapted to progressively form closure for the ends of said passage.

ALBERT GIGER.